US007719238B2

(12) United States Patent
Iida et al.

(10) Patent No.: US 7,719,238 B2
(45) Date of Patent: May 18, 2010

(54) SYSTEM FOR CONTROLLING CHARGE/DISCHARGE OF SECONDARY BATTERY, AND BATTERY CONTROLLER

(75) Inventors: Takuma Iida, Kadoma (JP); Kouta Togashi, Kosai (JP); Nobuyasu Morishita, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 545 days.

(21) Appl. No.: 11/713,425

(22) Filed: Mar. 1, 2007

(65) Prior Publication Data

US 2007/0205746 A1 Sep. 6, 2007

(30) Foreign Application Priority Data

Mar. 3, 2006 (JP) ............................. 2006-057180

(51) Int. Cl.
  *H02J 7/04* (2006.01)
  *H02J 7/16* (2006.01)
(52) U.S. Cl. ........................ 320/151; 320/134; 320/136; 320/161
(58) Field of Classification Search ................. 320/128, 320/130, 132, 134, 136, 148, 149, 151, 161; 340/636.12, 636.19
See application file for complete search history.

(56) References Cited

U.S. PATENT DOCUMENTS

| 5,773,961 | A  * | 6/1998  | Cameron et al.  | 320/132 |
| 5,781,448 | A  * | 7/1998  | Nakamura et al. | 700/293 |
| 5,872,453 | A  * | 2/1999  | Shimoyama et al.| 324/431 |
| 5,969,625 | A  * | 10/1999 | Russo           | 340/636.19 |
| 6,222,347 | B1 * | 4/2001  | Gong            | 320/137 |
| 6,225,784 | B1 * | 5/2001  | Kinoshita et al.| 320/132 |
| 6,377,880 | B1 * | 4/2002  | Kato et al.     | 701/29  |
| 6,456,041 | B1 * | 9/2002  | Terada et al.   | 320/132 |
| 6,781,514 | B2 * | 8/2004  | Murofushi       | 340/636.1 |
| 6,859,743 | B2 * | 2/2005  | Park            | 702/63  |
| 7,026,792 | B2   | 4/2006  | Murakami et al. |         |
| 7,321,220 | B2 * | 1/2008  | Plett           | 320/128 |
| 7,555,264 | B2 * | 6/2009  | Ishiwata et al. | 455/39  |
| 2002/0075015 | A1 * | 6/2002 | Morimoto et al. | 324/672 |
| 2003/0094816 | A1 * | 5/2003 | Kazama          | 290/40 C |

(Continued)

FOREIGN PATENT DOCUMENTS

JP          9074605 A        3/1997

(Continued)

*Primary Examiner*—Edward Tso
*Assistant Examiner*—Arun Williams
(74) *Attorney, Agent, or Firm*—Christensen O'Connor Johnson Kindness PLLC

(57) ABSTRACT

In a charging/discharging control system for controlling an allowable power level of a secondary battery at the time of charging/discharging operations, excessive discharging or recharging of the secondary battery is prevented, and excessive suppression of the charging/discharging of the secondary battery is prevented. A vehicle ECU controls charging/discharging of the secondary battery in accordance with a predetermined allowable power level. A battery ECU detects an actual loading power level of a secondary battery; calculates a differential power level between the detected actual loading power level and an allowable power level; measures the number of times the calculated differential power level has become equal to or lower than a predetermined threshold value; and downwardly revises the allowable power level when the count has become equal to or greater than a predetermined upper-limit level.

15 Claims, 11 Drawing Sheets

U.S. PATENT DOCUMENTS

2003/0117143 A1* 6/2003 Okada .................. 324/428
2005/0046389 A1* 3/2005 Kim ..................... 320/132
2005/0127877 A1* 6/2005 Tsuchiya et al. ......... 320/132
2005/0184984 A1* 8/2005 Kim ..................... 345/211

FOREIGN PATENT DOCUMENTS

JP        2003199258 A    7/2003

* cited by examiner

SYSTEM FOR CONTROLLING CHARGE/DISCHARGE OF SECONDARY BATTERY, AND BATTERY CONTROLLER

PRIORITY INFORMATION

This application claims priority to Japanese Patent Application No. 2006-57180 filed on Mar. 3, 2006, which is incorporated herein by reference in its entirety.

BACKGROUND OF THE INVENTION

1. Field of the Invention

The present invention relates to a technique for controlling power used for charging/discharging a secondary battery, such as a nickel hydrogen battery, a lithium ion battery, or the like mounted in an electric vehicle, a hybrid vehicle, or the like, as a power source for a motor or a drive source for various loads.

2. Related Art

On the occasion of usage of a secondary battery, such as a nickel hydrogen secondary battery, a lithium secondary battery, or the like, excessive discharge or excessive charge must be avoided. If a secondary battery is brought into a noticeably, excessively discharged state or a noticeably, excessively charged state, a gas is evolved by means of electrolysis of an electrolytic solution in a battery, which affects the life of the secondary battery.

Accordingly, in the field of an electric vehicle or a hybrid vehicle equipped with a secondary battery serving as a power source for a motor or a drive source for various loads, there has hitherto been proposed a technique in which a battery electronic control unit (hereinafter called a "battery ECU") determines an allowable discharging power level and an allowable charging power level (hereinafter the allowable discharging power level and the allowable charging power level are collectively called "allowable power level") which can be allowed by the secondary battery, in accordance with a charged state of the secondary battery (hereinafter called an "SOC" (State of Charge)), the temperature of the battery, and the like. An attempt is made to prevent excessive discharge or charge of a secondary battery; to prevent infliction of damage to the secondary battery or deterioration thereof; and to achieve longer life of the secondary battery, by means of a vehicle control unit (hereinafter called a "vehicle ECU") controlling charging/discharging of the secondary battery in such a way that the allowable power level determined by the battery ECU is taken as a target level and is not surpassed.

Japanese Patent Laid-Open Publication No. 9-74605 describes a regenerative brake controller mounted in an electric vehicle equipped with a motor and comprising: means for determining an upper-limit charging power level from a state of a secondary battery; means for controlling an upper-limit control target value for regenerative brake from the upper-limit charging power level and the number of rotations of a motor; and means for diminishing the control target value for regenerative brake when the voltage of the battery has surpassed a predetermined allowable value.

Incidentally, in the case of a secondary battery which is mounted in an electric vehicle, a hybrid vehicle, or the like, and iterates charging/discharging operations within a short period of time, power does not become stable, and temporal variations are great, as shown in FIG. 11. Therefore, even when power has surpassed once a predetermined allowable value, power does not always surpass the allowable value continually. Shortly, even when power has surpassed a predetermined allowable value, excessive discharge or charge of the secondary battery does not always lead to infliction of damage to the secondary battery or deterioration thereof. Consequently, as in the case of the regenerative brake controller described in Japanese Patent Laid-Open Publication No. 9-74605, when the control target value for regenerative braking power decreases the voltage of the battery has surpassed the predetermined allowable value once, there may arise a case where the control target value is reduced more than necessary and charge of the secondary battery is restricted more than necessary.

SUMMARY OF THE INVENTION

Accordingly, the present invention prevents excessive restriction of charging/discharging of a secondary battery while preventing excessive discharge or charge of the secondary battery in a charging/discharging control system that controls an allowable power level of the secondary battery for charge/discharge operations.

The present invention provides a system for controlling charging/discharging of a secondary battery, comprising:

a power level calculating section for calculating an actual loading power level of a secondary battery;

a differential calculating section for calculating a differential power level between the calculated actual loading power level and an allowable power level achieved during charging/discharging of the secondary battery; and an allowable power level control section for measuring the number of times the calculated differential power level has become equal to or lower than a predetermined threshold value and downwardly revising the allowable power level when a count has become equal to or greater than a predetermined upper-limit value.

In one mode of the system for controlling charging/discharging of a secondary battery of the present invention, the allowable power level control section measures the number of times the calculated differential power level has continually become equal to or lower than the predetermined threshold value.

Moreover, in one mode of the system for controlling charging/discharging of a secondary battery of the present invention, the allowable power level control section measures the number of times the calculated differential power level has become equal to or lower than the predetermined threshold value within a predetermined period.

Further, in one mode of the system for controlling charging/discharging of a secondary battery of the present invention, the allowable power level control section increases an amount of downward revision to the allowable power level as the count is greater.

In addition, in one mode of the system for controlling charging/discharging of a secondary battery of the present invention, the allowable power level control section increases an amount of downward revision to the allowable power level as the differential power level is greater.

In one mode of the system for controlling charging/discharging of a secondary battery of the present invention, the system further comprises cutoff means for cutting off charging/discharging of the secondary battery, wherein the allowable power level control section downwardly revises the allowable power level to zero and requests the cutoff means to cut charging/discharging of the secondary battery when the count has reached a predetermined highest-limit value.

Further, in one mode of the system for controlling charging/discharging of a secondary battery of the present invention, when there are a plurality of allowable power levels whose power levels differ from each other, the allowable power control section downwardly revises the allowable power level having reached the upper-limit value by an amount of downward revision determined for each allowable power level each time the count reaches the upper-limit value determined for each allowable power level.

In addition, in one mode of system for controlling charging/discharging of a secondary battery of the present invention, the secondary battery is formed by combination of a plurality of battery modules;

the allowable power level is determined for each of blocks into which battery modules constituting the secondary battery are divided on a predetermined unit;

the power level calculating section calculates an actual loading power level of the secondary battery on a per-block basis; and the allowable power level control section measures the number of times a differential power level calculated on a per-block basis has become equal to or lower than a predetermined threshold value and downwardly revises each of the allowable power levels determined for each block when the count has become equal to or greater than a predetermined upper-limit value.

The present invention provides a battery controller for adaptively setting an allowable power level of a secondary battery subjected to charging/discharging control within a range of charging/discharging capability in accordance with the allowable power level set according to at least a temperature, the controller comprising:

a power level calculating section for calculating an actual loading power level of the secondary battery;

a differential calculating section for calculating a differential power level between a calculated actual loading power level and the allowable power level; and an allowable power level control section for measuring the number of times the calculated differential power level has become equal to or lower than a predetermined threshold level and downwardly revising the allowable power level when the count has become equal to or greater than a predetermined upper-limit level.

The present invention provides a system for controlling charging/discharging of a secondary battery, comprising:

a power level calculating section for calculating an actual loading power level of a secondary battery;

a differential calculating section for calculating a differential power level between the calculated actual loading power level and an allowable power level achieved during charging/discharging of the secondary battery; and an allowable power level control section for, when the calculated differential power level has become equal to or lower than a predetermined threshold level and also the actual loading power level surpasses the allowable power level, downwardly revising the allowable power level by a greater amount of downward revision as the differential power level is greater.

The present invention also provides a battery controller for adaptively setting an allowable power level of a secondary battery subjected to charging/discharging control within a range of charging/discharging capability in accordance with the allowable power level set according to at least a temperature, the controller comprising:

a power level calculating section for calculating an actual loading power level of the secondary battery;

a differential calculating section for calculating a differential power level between a calculated actual loading power level and the allowable power level; and, an allowable power level control section for, when the calculated differential power level has become equal to or lower than a predetermined threshold value level and also the actual loading power level surpasses the allowable power level, downwardly revising the allowable power level by a greater amount of downward revision as the differential power level is greater.

The present invention provides a system for controlling charging/discharging of a secondary battery, comprising:

an allowable level setting section for setting an allowable power level of the secondary battery according to at least one of a battery temperature, a state of charge, and a battery voltage of the secondary battery; and a charging/discharging control section for controlling charging/discharging of the secondary battery according to the allowable power level, the section allowing charging/discharging operations exceeding the allowable power level before the number of times an actual loading power level of the secondary battery has exceeded the allowable power level reaches a predetermined number of times, and, when the number of times has reached the predetermined number of times, controlling charging/discharging of the secondary battery in accordance with a second allowable power level which is lower than the allowable power level.

Further, in one mode of the charging/discharging control system of the present invention, the secondary allowable power level becomes lower as the number of times becomes greater within a predetermined period.

In addition, in one mode of the charging/discharging control system of the present invention, the secondary allowable power level becomes essentially zero when the number of times has reached an upper-limit number of times greater than the predetermined number of times within a predetermined period of time, and the control section stops charging/discharging of the secondary battery.

According to the present invention, in a charging/discharging control system for controlling an allowable power level of a secondary battery during charging/discharging operation, excessive discharge or charge of the secondary battery is prevented, and greater-than-necessary suppression of the charging/discharging of the secondary battery can be prevented.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail based on the following figures, wherein.

DETAILED DESCRIPTION OF THE PREFERRED EMBODIMENT

A best mode (hereinafter called an "embodiment") for implementing the present invention will be described hereinbelow by reference to the drawings and by means of taking a hybrid vehicle as an example. The present embodiment describes, by way of an example, a hybrid vehicle which is one type of electric vehicle, but can also be applied to another electric vehicle equipped with a motor (a traction motor) serving as a drive source.

Figure 1:
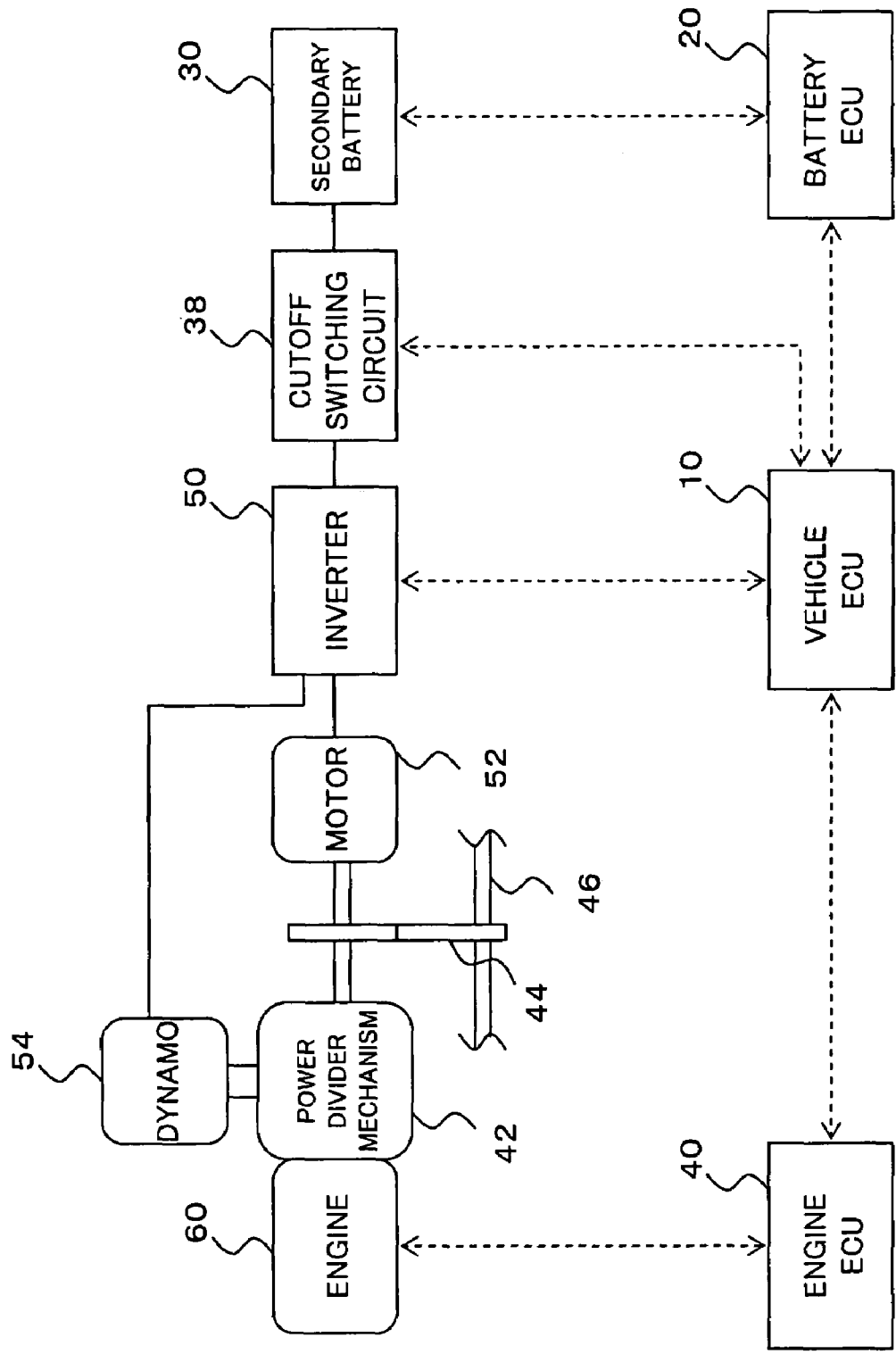
FIG. 1 is a view showing a general configuration of a hybrid vehicle according to a first modification of an embodiment of the present invention.

FIG. 1 is a view showing the general configuration of a hybrid vehicle of the present embodiment. In FIG. 1, a vehicle ECU 10 controls an inverter 50, an engine ECU (electronic control unit) 40, and a cutoff switching circuit 38. The engine ECU 40 controls an engine 60. A battery electronic control unit (hereinafter called a "battery ECU") 20 estimates an SOC of a secondary battery 30 upon receipt of, from the secondary battery 30, information about a battery voltage V, a charge/discharge current I, and a battery temperature T. The battery ECU 20 determines an allowable discharging power level Pout and an allowable recharging power level Pin, which can be allowed by the secondary battery 30 in the current SOC; and transmits, to the vehicle ECU 10, the thus determined allowable discharging power level Pout, the determined allowable recharging power level Pin, and battery information such as the SOC and temperature of the secondary battery 30, and the like. By means of taking the allowable discharging power level Pout and the allowable recharging power level Pin as target values for limitation, the vehicle ECU 10 controls the engine ECU 40, the inverter 50, and the like, in accordance with various pieces of battery information, thereby controlling charging/discharging operations of the secondary battery 30. The allowable discharging power level Pout and the allowable recharging power level Pin are generically called hereunder an allowable power level P.

Figure 2:
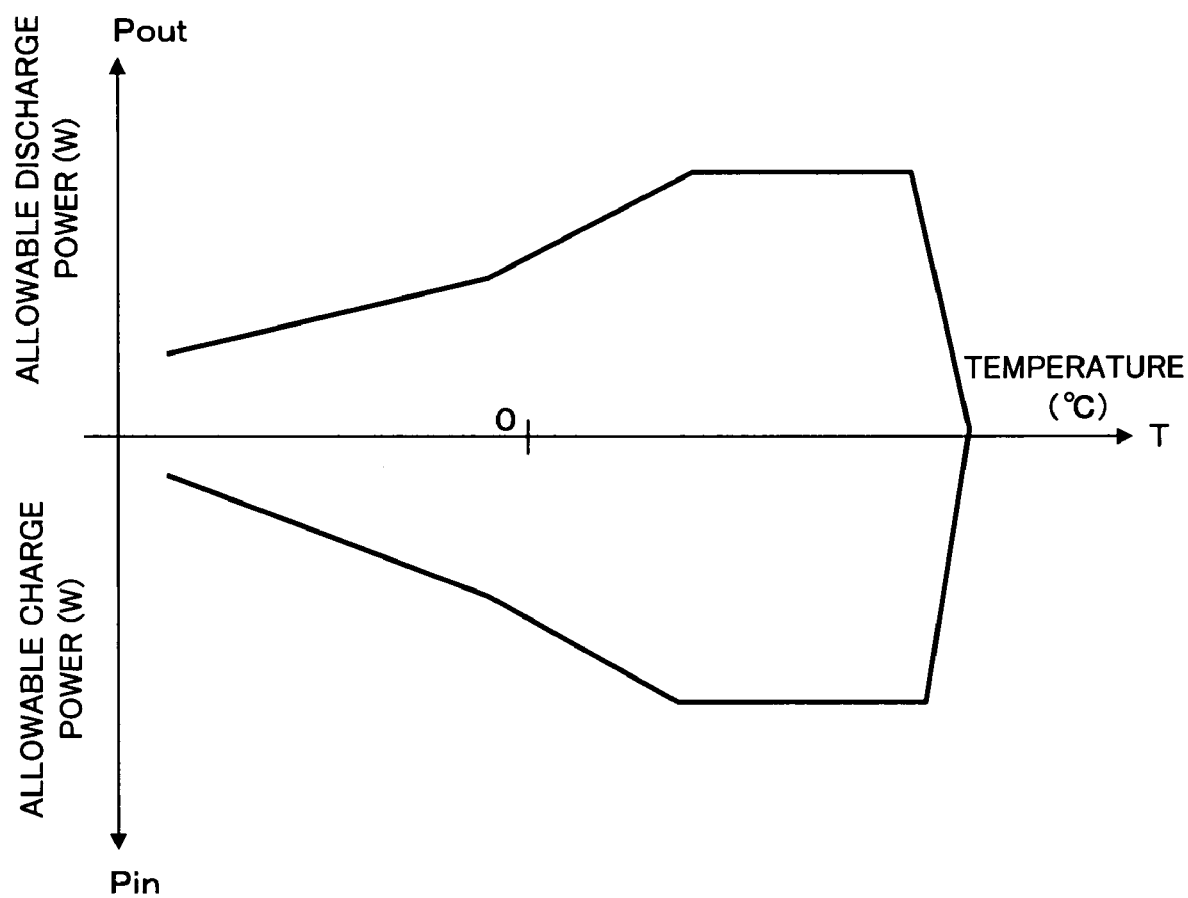
FIG. 2 is a view showing an example reference map to which a reference is made when a battery ECU determines an allowable power level from the temperature of a battery.
Figure 3:
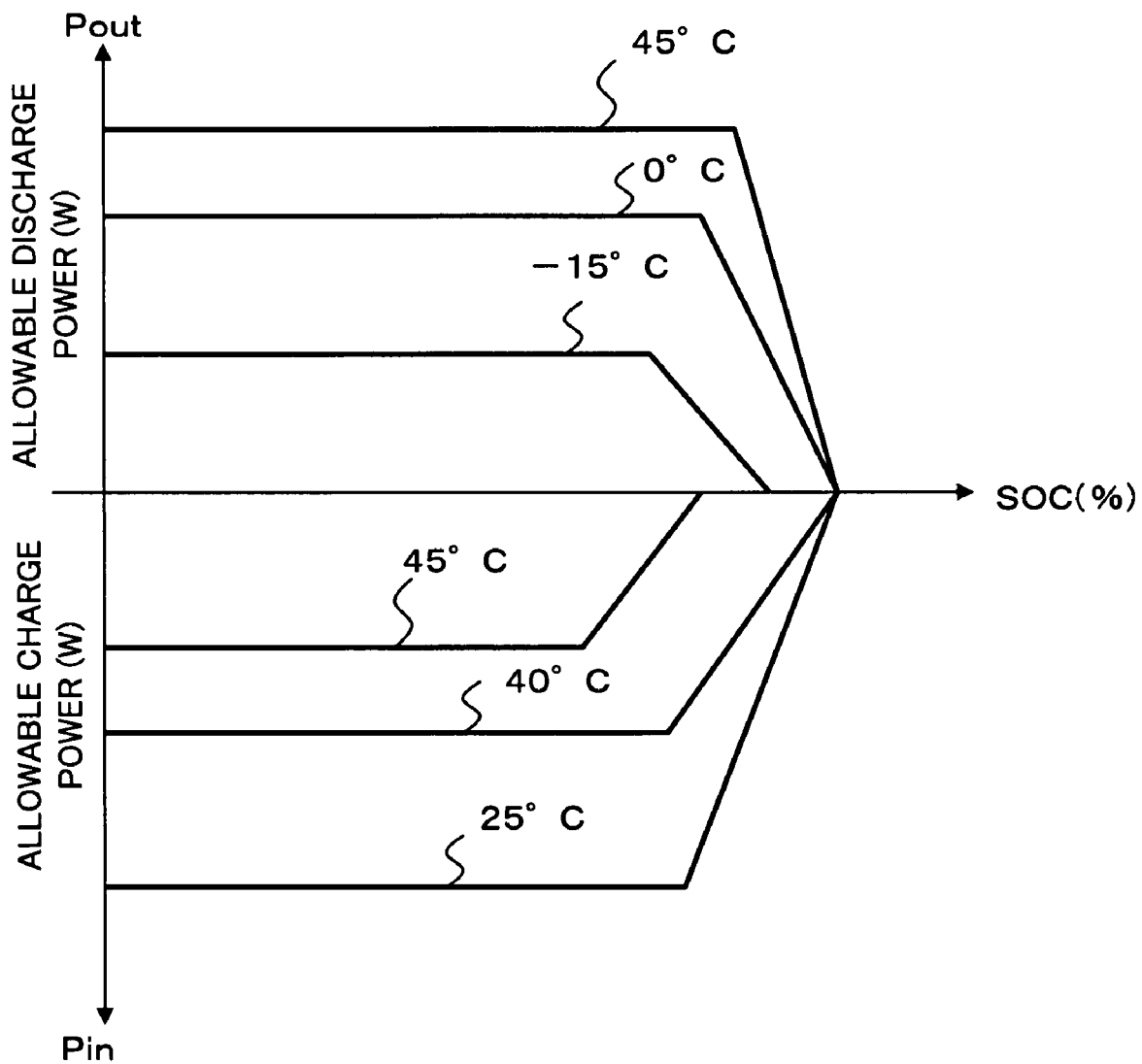
FIG. 3 is a view showing another example reference map to which a reference is made when the battery ECU determines an allowable power level from the temperature of the battery and an SOC.
Figure 4:
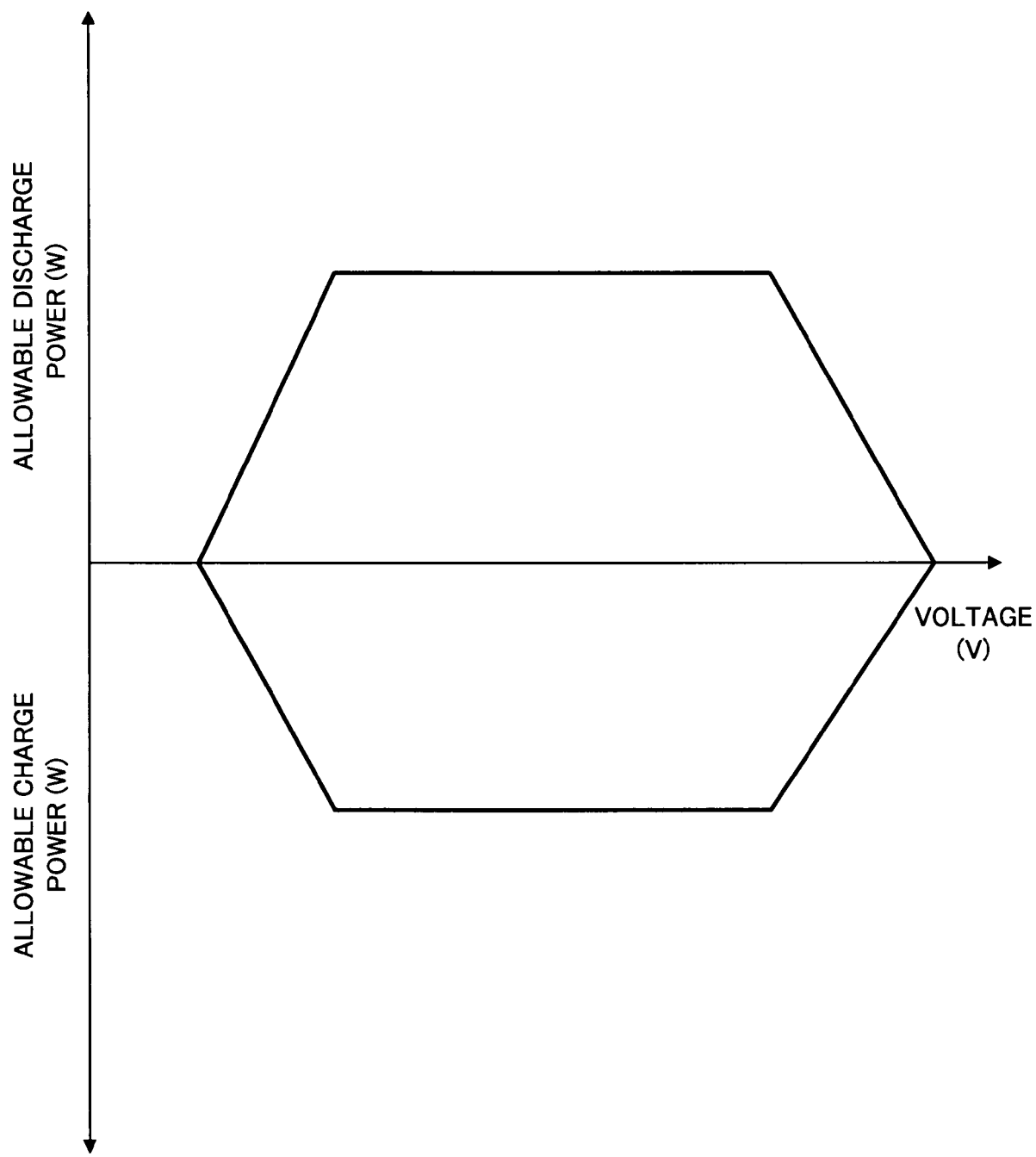
FIG. 4 is a view showing still another example reference map to which a reference is made when the battery ECU determines an allowable power level from the voltage of the battery.

The battery ECU 20 determines, e.g., the allowable discharging power level Pout and the allowable recharging power level Pin, while taking the battery temperature T as a parameter. By reference to a reference map such as that shown in, e.g., FIG. 2, the battery ECU 20 determines the allowable discharging power level Pout and the allowable recharging power level Pin corresponding to the battery temperature T. Alternatively, the battery ECU 20 may also determine the allowable discharging power level Pout and the allowable recharging power level Pin from an SOC and a battery temperature T. In this case, the battery ECU 20 determines the allowable discharging power level Pout and the allowable recharging power level Pin by reference to a reference map, such as that shown in FIG. 3, and by means of taking the battery temperature T and the SOC as parameters. Moreover, the battery ECU 20 may also determine an allowable power level P by means of taking the battery voltage V as a parameter. In this case, the battery ECU 20 determines the allowable power level P by means of taking the battery voltage V as a parameter and by reference to the reference map such as that shown in FIG. 4.

Turning back to FIG. 1, the secondary battery 30 supplies a motor 52 with power via the cutoff switching circuit 38. At the time of discharge of the secondary battery 30, the inverter 50 converts the d.c. power supplied from the secondary battery 30 into a.c. power; and supplies the a.c. power to the motor 52.

The engine 60 transmits power to wheels via a power divider mechanism 42, a reduction gear 44, and a drive shaft 46. The motor 52 transmits power to the wheels via the reduction gear 44 and the driveshaft 46. When the secondary battery 30 requires recharging, a portion of power of the engine 60 is supplied to a generator 54 via the power divider mechanism 42 and utilized for recharging.

The cutoff switching circuit 38 is interposed between the secondary battery 30 and the inverter 50. In accordance with an open-close command transmitted from the vehicle ECU 10, the cutoff switching circuit 38 performs opening/closing of a switching element which electrically connects the secondary battery 30 to the inverter 50. By means of bringing this switching element into an open state, transmission of power between the secondary battery 30 and the inverter 50 is cut off.

The vehicle ECU 10 outputs a control command to the engine ECU 40 and the inverter 50 in accordance with information about the driving state of the engine 60 from the engine ECU 40; driving information such as the amount of actuation of a gas pedal, the amount of actuation of a brake pedal, and a shift range set by a shift lever; and an SOC, the allowable discharging power level Pout, and the allowable recharging power level Pin, or the like, from the battery ECU 20, thereby driving the engine 60 and the motor 52. Moreover, when the battery ECU 20 has determined occurrence of a situation of inducing considerable deterioration of life of the battery, such as excessive charge or discharge of the secondary battery 30, and outputs to the vehicle ECU 10 a request to open the cutoff switching circuit 38, the vehicle ECU 10 transmits an open command to the cutoff switching circuit 38. Thus, transmission of power between the secondary battery 30 and the inverter 50 is cut, thereby minimizing deterioration of life of the battery.

Figure 5:
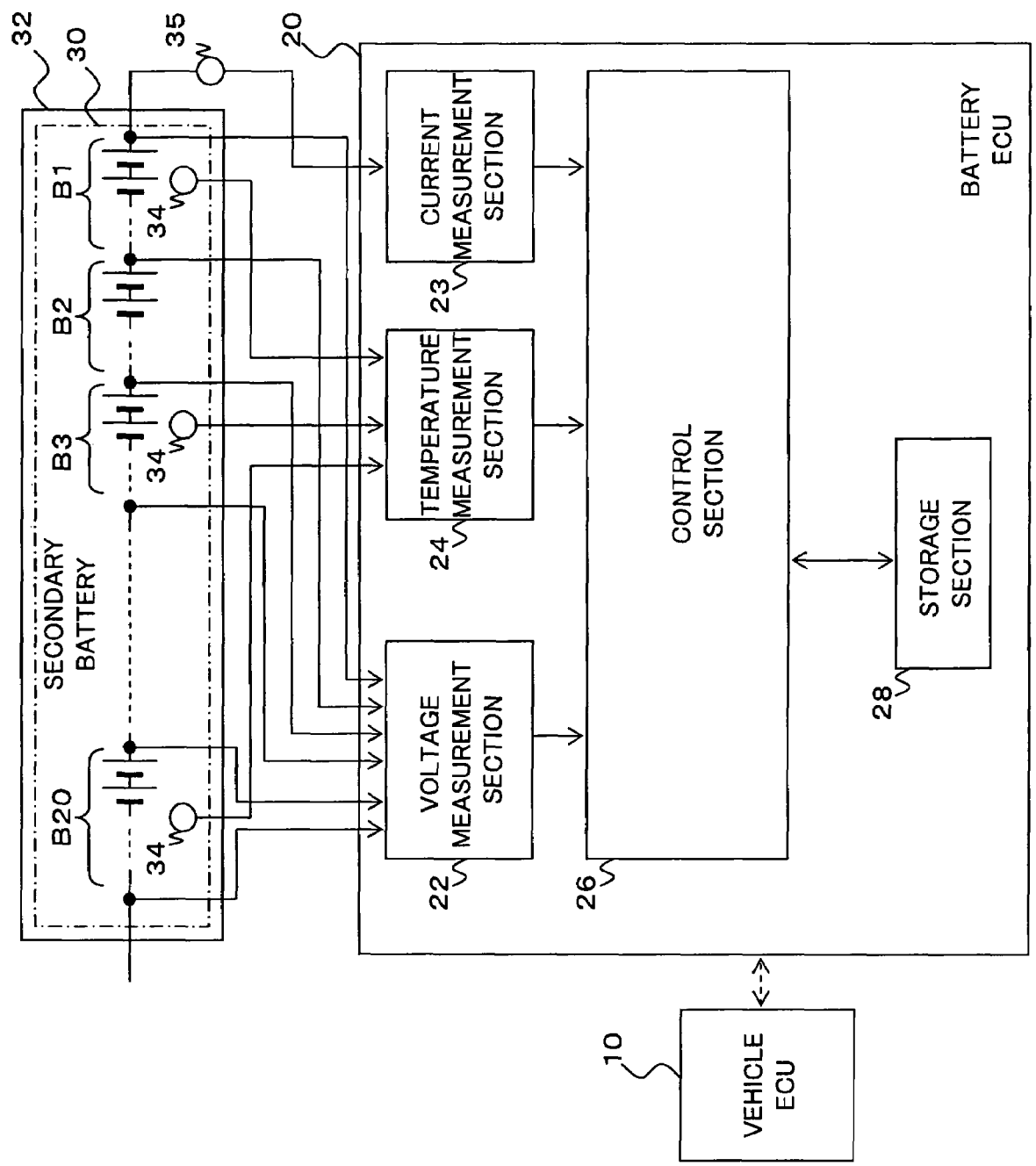
FIG. 5 is a view showing a functional block for describing the battery ECU and a secondary battery.

As shown in FIG. 5, the secondary battery 30 is formed by connecting battery blocks B1 to B20 in series. These battery blocks B1 to B20 are housed in a battery case 32. Each of the battery blocks B1 to B20 is formed by means of electrically connecting two battery modules in series. Moreover, each of the battery modules is formed by electrically connecting six single cells in series. A nickel hydrogen battery, a lithium ion battery, or the like can be used as the single cell. No specific limitations are imposed on the number of battery blocks, the number of battery modules, and the number of single cells. Also, the configuration of the secondary battery 30 is not limited to the above-described example.

Moreover, a plurality of temperature sensors 34 are provided within the battery case 32. The plurality of temperature sensors 34 are arranged by means of taking a plurality of battery blocks whose temperatures are relatively close to each other as one group or taking a single battery block whose temperature comparatively differs from the temperatures of the other battery blocks as a single group; and placing a single temperature sensor 34 for each group. The battery blocks are grouped by measuring the temperature of each of the battery blocks through a preliminary experiment or the like. In the present embodiment, M (M is an integer) temperature sensors 34 are assumed to be provided, and temperatures measured by the respective temperature sensors 34 are expressed as T(1) to T(M).

In FIG. 5, a voltage measurement section 22 measures a voltage appearing at a terminal of the secondary battery 30. In the present embodiment, the voltage measurement section 22 measures terminal voltages V(1) to V(20) of the battery blocks B1 to B20. The voltage measurement section 22 generates voltage data used for specifying the terminal voltages V(1) to V(20), and outputs the thus-generated voltage data to the control section 26. The voltage measurement section 22 outputs voltage data to the control section 26 at a preset frequency, and the control section 26 stores the voltage data into a storage section 28. The control section 26 summates the terminal voltages V(1) to V(20) indicated by the voltage data stored in the storage section 28, thereby calculating the battery voltage V.

A current measurement section 23 measures a charge/discharge current I achieved during discharging or recharging of the secondary battery 30. In the present embodiment, the current measurement section 23 converts an analogue signal output from a current sensor 35 into a digital signal. In accordance with the digital signal, there are generated current data used for specifying an electric current input to the secondary battery 30 during recharging operation and an electric current output from the secondary battery 30 during discharging operation. The current data are out put to the control section 26. The current measurement section 23 generates current data; e.g., negative current data during recharging operation and positive current data during discharging operation. The current measurement section 23 outputs current data to the control section 26 at a preset cycle, and the control section 26 stores the current data into the storage section 28.

A temperature measurement section 24 measures the temperature of the secondary battery 30. In the embodiment, analogue signals output from the respective temperature sensors 34 set for the respective groups are converted into digital signals. Temperature data used for specifying the temperature of a battery for each group are generated from the digital signals. The thus-generated temperature data are output to the control section 26. The temperature measurement section 24 outputs temperature data to the control section 26 at a preset frequency, as well. The control section 26 stores the temperature data into the storage section 28. The control section 26 determines a battery temperature T by means of determining, e.g., a mean value of temperatures T(1) to T(M) indicated by the temperature data stored in the storage section 28.

The control section 26 adds up the battery voltage V and the charge/discharge current I, thereby calculating an actual load power level Pr of the secondary battery 30; and calculates an absolute value of a difference between the actual load power level Pr and the allowable power level P, thereby determining a differential power level ΔP. Further, the control section 26 performs processing for updating the allowable power level P from the differential power level ΔP. Processing for updating the allowable power level P performed by the control section 26 will be described in detail later by use of a flowchart.

In the present embodiment, in the hybrid vehicle configured as mentioned above, the control section 26 provided for the battery ECU 20 updates (downwardly revises), as required, the allowable discharging power level Pout and the allowable recharging power level Pin determined from the battery temperature T so that the secondary battery 30 can exhibit sufficient charging/discharging capability while excessive discharge or charge of the secondary battery 30 is being prevented.

Figure 6:
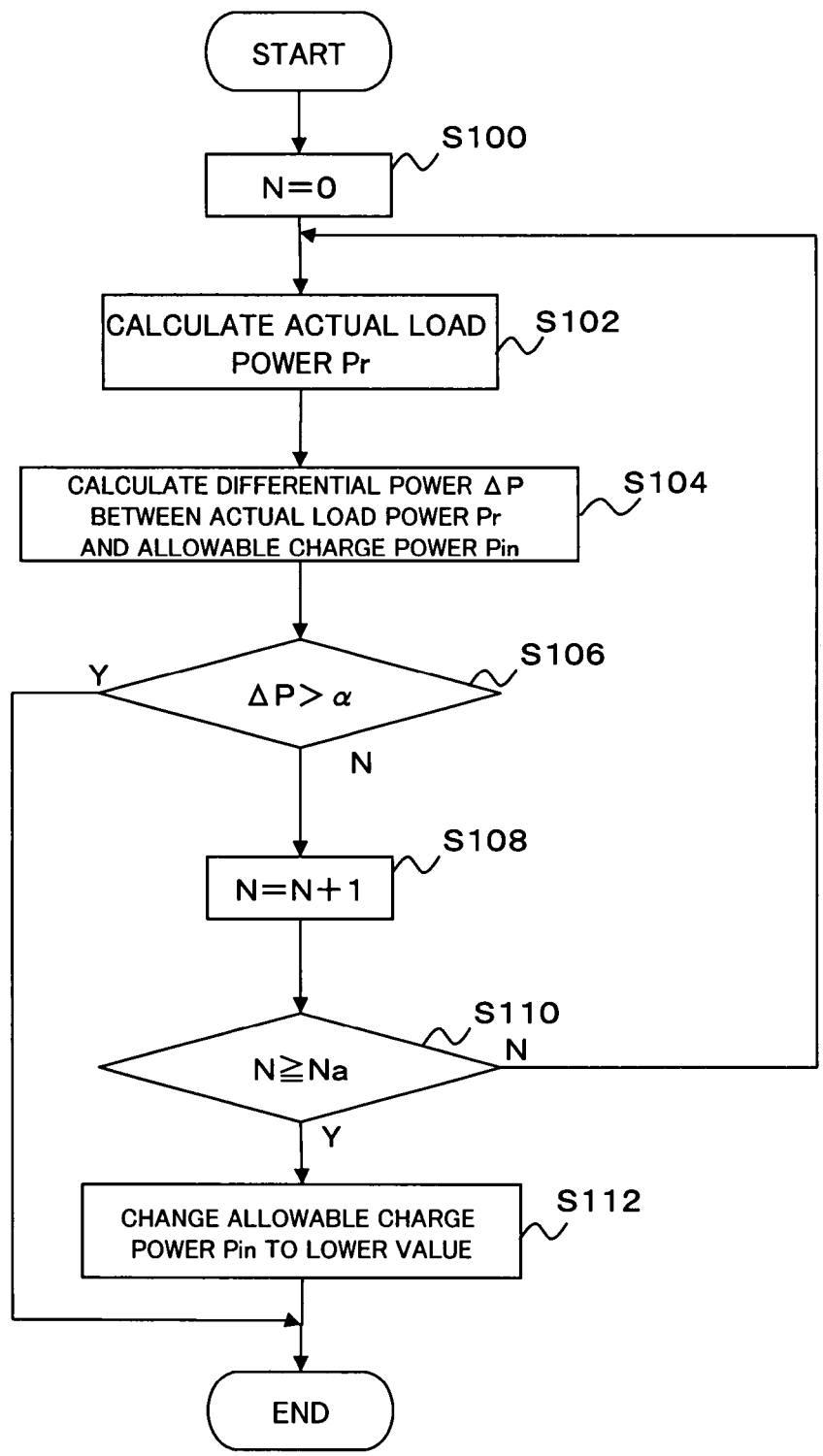
FIG. 6 is a flowchart showing processing procedures employed when the battery ECU of the present embodiment makes downward revision on the allowable battery level.

Processing procedures by means of which the control section 26 updates the allowable recharging power level Pin are described by use of a flowchart shown in FIG. 6. The allowable discharging power level Pout can be subjected to downward revision through processing procedures analogous to those described below. In relation to procedures for correcting the allowable discharging power level Pout, the allowable recharging power level Pin is replaced with the allowable discharging power level Pout, as required.

In FIG. 6, after having initialized the count of a counter N (S100), the control section 26 calculates the actual loading power level Pr, as mentioned above (S102). Subsequently, the control section 26 calculates a differential power level ΔP (i.e., |Pr−Pin|=ΔP) between the actual loading power level Pr and the allowable recharging power level Pin determined by reference to the reference map as mentioned above (S104). The control section 26 determines whether or not the differential power level ΔP is lower than a predetermined threshold value α (S106). When the differential power level ΔP is greater than the threshold value α [when the result of the determination rendered in step S106 is affirmative (Y)], the control section 26 determines that the vehicle ECU 10 is controlling the engine ECU 40, the inverter 50, and the like, in such a way that the allowable recharging power level Pin is not surpasses, thereby stopping downwardly revising operation. In the present embodiment, when the differential power level ΔP is greater than the threshold value, the vehicle ECU 10 is determined to being controlling the engine ECU 40, the inverter 50, and the like, with the actual loading power level Pr being sufficiently lower than the allowable recharging power level Pin, and does not downwardly revise the allowable recharging power level Pin. However, as mentioned previously, the differential power level ΔP is determined from an absolute value of a difference between the actual loading power level Pr and the allowable recharging power level Pin. Hence, there arises a case where, even when the actual loading power level Pr is far greater than the allowable recharging power level Pin, the differential power level ΔP becomes greater than the threshold value α. In this case, there is a chance of degradation of the secondary battery 30 being caused. However, in order to prevent occurrence of such a situation, when the actual loading power level Pr has reached the predetermined upper-limit power level Ph, the battery ECU 20 performs such a control operation that an open command is output to the cutoff switching circuit 38 by way of the vehicle ECU 10, to thus cut off transmission of power between the secondary battery 30 and the inverter 50 and prevent degradation of the secondary battery 30. Therefore, processing which has hitherto been performed is utilized for protection of the secondary battery 30 in a case where the actual loading power level Pr is much greater than the allowable recharging power level Pin, and no consideration is given to such a case in the present embodiment. The same also applies to the allowable discharging power level Pout.

Meanwhile, so long as the differential power level ΔP is lower than the threshold value α (the result of the determination rendered in step S106 is negative "N"), the control section 26 determines that the vehicle ECU 10 causes the secondary battery 30 to effect recharging in the vicinity of the allowable recharging power level Pin. After having incremented the count of the counter N (S108), the control section 26 determines whether or the count of the counter N has reached a predetermined upper-limit count Na (S110). When a result of determination shows that the upper-limit count Na is not reached (when a result of determination rendered in step S110 is negative "N"), the battery ECU 20 iterates processing subsequent to step S102.

In contrast, when the count has reached the upper-limit count Na (when a result of determination rendered in step S110 is affirmative "Y"), the control section 26 determines that the vehicle ECU 10 causes the secondary battery 30 to not continually effect recharging operation in the vicinity of the allowable recharging power level Pin and that further continuation of recharging operation may induce degradation of the secondary battery 30, and subjects the allowable recharging power level Pin to downward revision (S112). The battery ECU 20 downwardly revises the allowable recharging power level Pin to one-half thereof. When an interval of measurement of the actual loading power level Pr is 100 msec, the upper-limit count Na is set to, e.g., 20.

As mentioned above, in the present embodiment, the control section 26 provided for the battery ECU 20 measures a count acquired when the differential power level $\Delta P$ between the actual loading power level Pr and the allowable power level P has continually become equal to or lower than the predetermined threshold value $\alpha$, and subjects the allowable power level P to downward revision when the count has reached the predetermined upper-limit count Na. Thus, excessive charging/discharging of the secondary battery 30 can be prevented. Moreover, when the actual loading power level Pr has temporarily surpassed the allowable power level P, the allowable power level P is downwardly revised, to thus prevent more-than-necessary reduction in the allowable power level P, and there can be prevented more-than-necessary suppression of charging/discharging of the secondary battery 30

Subsequently, a first modification of the present embodiment will be described. The first modification differs from the above embodiment in that the amount of downward revision made to the allowable power level P is increased with an increase in the count of the counter N. The first modification also differs from the embodiment in that, depending on the count of the counter N, the switching element of the cutoff switching circuit 38 is opened rather than the allowable power level P being subjected to downward revision, thereby cutting off transmission of power between the secondary battery 30 and the inverter 50 and preventing excessive charging/discharging of the secondary battery 30.

Processing procedures of the first modification by means of which the control section 26 updates the allowable recharging power level Pin will be described by use of a flowchart shown in FIG. 7. Steps S100 to S108 shown in FIG. 7 are analogous to steps S100 to S108 shown in FIG. 6 in terms of processing, and hence their explanations are omitted, and processing subsequent to step S120 is described.

Figure 7:
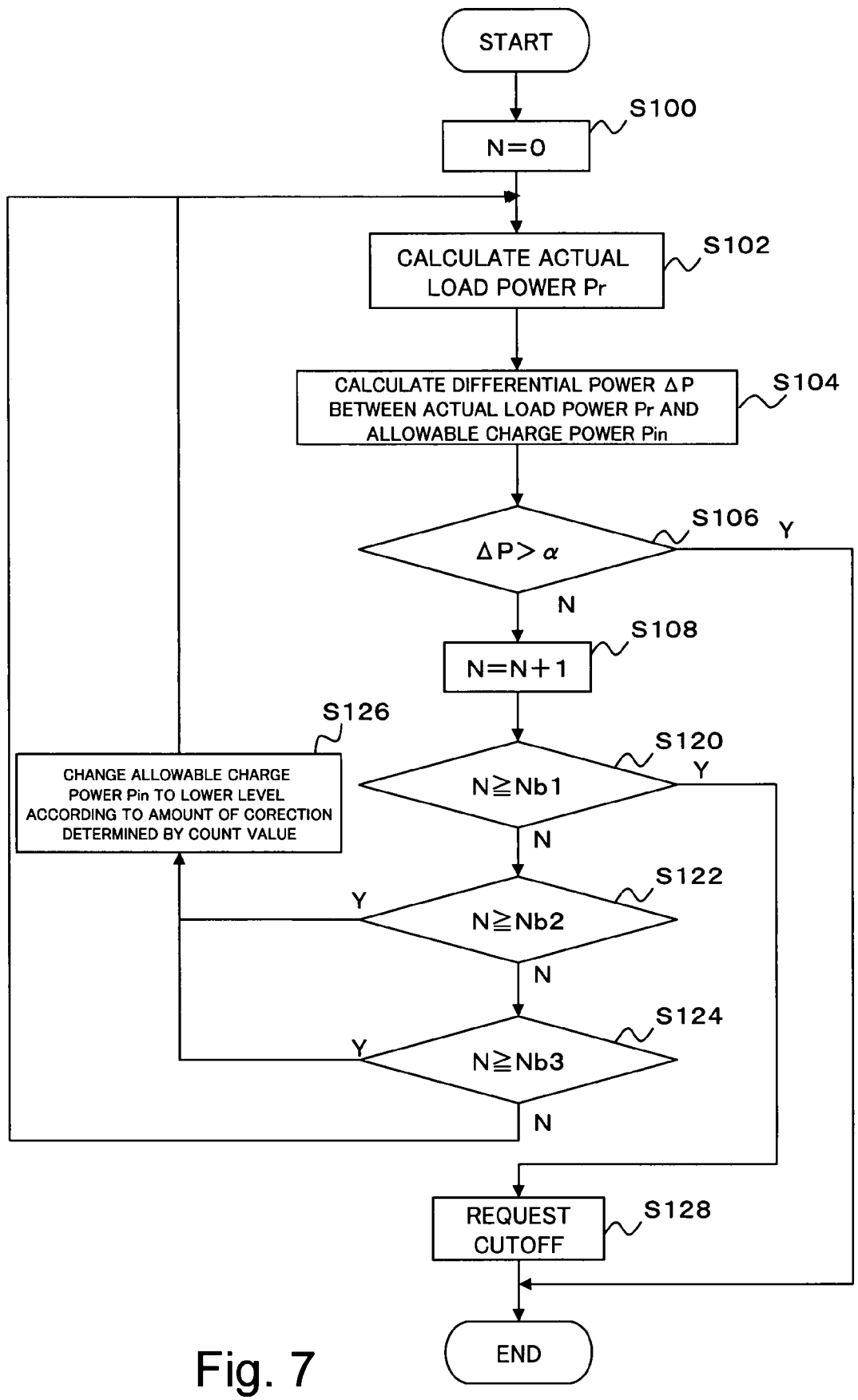
FIG. 7 is a flowchart showing processing procedures employed when the battery ECU of a first modification makes downward revision on the allowable battery level.

In FIG. 7, the control section 26 increments the count of the counter N, thereby determining whether or not the count of the counter N has reached a first upper-limit value Nb1 (e.g., Nb1=60) (S120). When a result of determination shows that the first upper-limit value Nb1 has been reached (a result of determination rendered in step S120 is affirmative "Y"), the control section 26 determines that the vehicle ECU 10 anomaly fails to control the engine ECU 40, the inverter 50, and the like, such that the allowable recharging power level Pin is not surpassed, regardless of downward revision to the allowable recharging power level Pin to be described later; and transmits a cutoff request to the vehicle ECU 10 so as to open the cutoff switching circuit 38 (S128). Upon receipt of the cutoff request from the battery ECU 20, the vehicle ECU 10 transmits an open command to the cutoff switching circuit 38. As a result, transmission of power between the secondary battery 30 and the inverter 50 is cut off, and recharging of the secondary battery 30 is interrupted. Thus, excessive recharging of the secondary battery 30 (excessive discharge of the same for the case of the allowable discharging power level Pout), which would otherwise be caused by an anomalous state, can be prevented.

Meanwhile, when the first upper-limit value Nb1 has not yet been reached (the result of determination rendered in step S120 is negative "N"), the control section 26 subsequently determines whether or not the count of the counter N has reached a second upper-limit value Nb2 (Nb2<Nb1, for example, Nb2=40) (S122). When a result of determination shows that the count of the counter N has reached a second upper-limit value Nb2 (a result of determination rendered in step S122 is affirmative "Y"), the control section 26 subjects the allowable recharging power level Pin to downward revision (S126). At this time, the battery ECU 20 subjects the allowable recharging power level Pin to downward revision by the amount of downward revision corresponding to that achieved in the case of the second upper-limit value Nb2. For instance, when the count of the counter N has reached the second upper-limit value Nb2, the battery ECU 20 corrects the current allowable recharging power level Pin to 0. In short, recharging of the secondary battery 30 is prohibited. Subsequently, the battery ECU 20 continues processing subsequent to step S102.

In contrast, when the count of the counter N has not reached the second upper-limit value Nb2 (the result of determination made in step S122 is negative "N"), the control section 26 determines whether or not the count of the counter N has reached a third upper-limit value Nb3 (Nb3<Nb2, for example, Nb3=20) (S124). When the result of determination shows that the count of the counter N has not reached the third upper-limit value Nb3 (the result of determination rendered in step S124 is negative "N"), the control section 26 continues processing subsequent to step S102. Meanwhile, when the count of the counter N has reached the third upper-limit value Nb3 (the result of determination rendered in step S124 is affirmative "Y"), the control section 26 subjects the allowable recharging power level Pin to downward revision by the amount of downward revision corresponding to that achieved in the case of the third upper-limit value Nb3 (S126). For instance, when the count of the counter N has reached the third upper-limit value Nb3, the control section 26 corrects the allowable recharging power level Pin to one-half the current allowable recharging power level Pin. After having made a correction, the control section 26 continues processing subsequent to step S102.

As above, according to the first modification, the control section 26 increases the amount of downward revision to the allowable power level P with an increase in the count of the counter N. Specifically, in the first modification, the control section 26 subjects the allowable power level P stepwise to downward revision in accordance with the count of the counter N. Accordingly, greater-than-necessary suppression of the charging/discharging of the secondary battery 30 can be prevented, to a greater extent than in the above embodiment.

The first modification of the above embodiment has described a case where the allowable recharging power level Pin and the allowable discharging power level Pout, which are determined by means of taking as parameters the battery temperature T, the SOC, and the battery voltage, are single power levels. However, there is a case where the battery ECU 20 determines a plurality of allowable power levels P while the battery temperature T, the SOC, and the battery voltage are taken as parameters so that the vehicle ECU 10 can alter an allowable power level P to be referred to according to the amount of power required by the secondary battery 30 and a retention time during which the amount of power can be retained.

Figure 8:
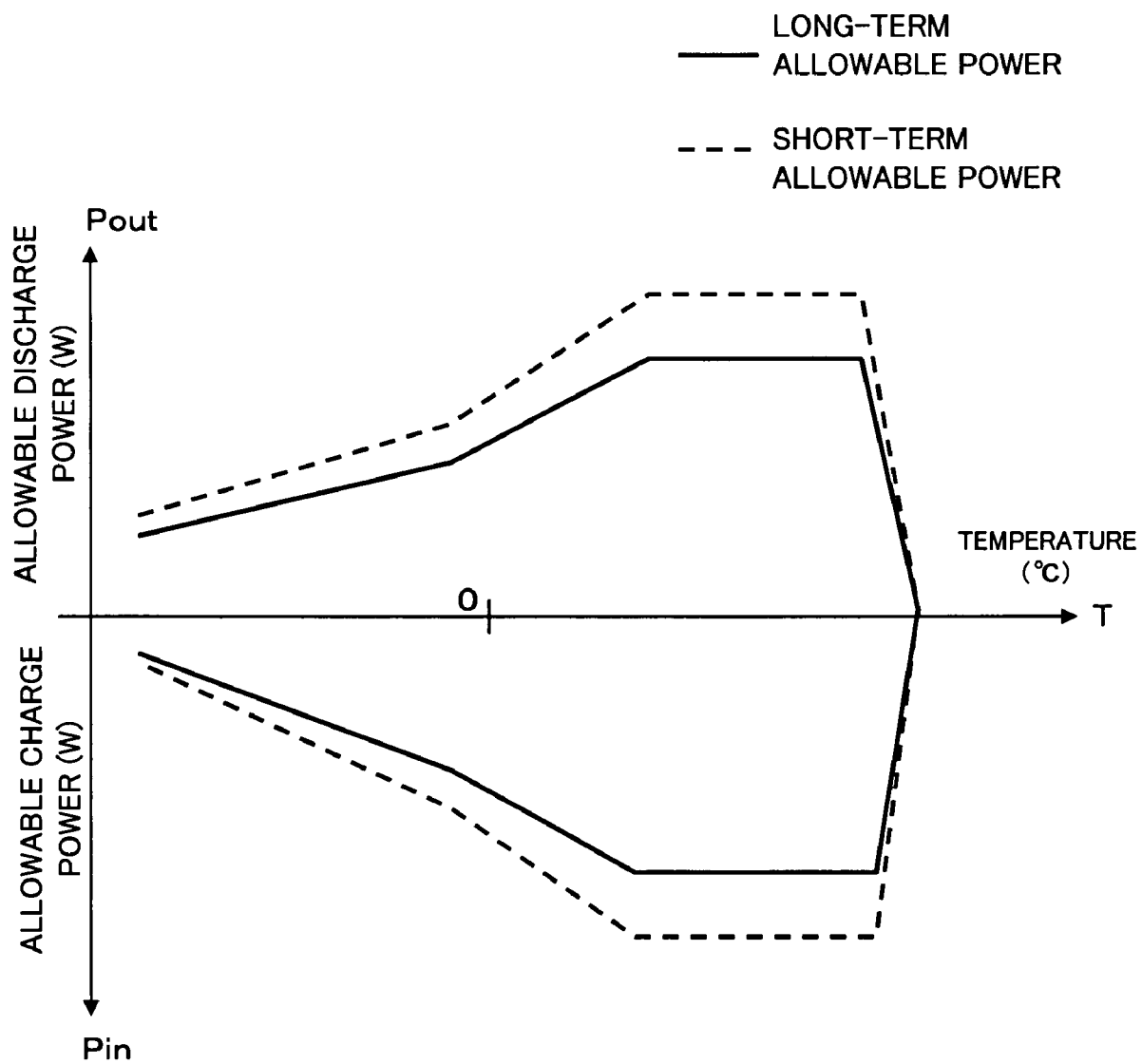
FIG. 8 shows an example reference map to which the battery ECU makes a reference when determining a short-term allowable power level Ps and a long-term allowable power level Pl from the temperature of the battery.

For instance, the control section 26 provided for the battery ECU 20 determines a short-term allowable power level Ps to which the vehicle ECU 10 makes a reference when a high output is required for a short period, and a long-term allowable power level Pl which is lower than the short-term allowable power level Ps and to which a reference is made when a mean output is required over as long a period as possible; and provides the vehicle ECU 10 with the power levels. When a high output is required for a comparatively-short period of time as in the case of start of the engine or a gear change, the vehicle ECU 10 controls charging/discharging of the secondary battery 30 by reference to the short-term allowable power level Ps. When an output is required to a certain extent for a comparatively-long period as in the case of driving at a constant speed, the vehicle ECU 10 makes a reference to a long-term allowable power level Pl (a reference is made to Japanese Patent Laid-Open Publication No. 2003-199258). For instance, by reference to a reference map such as that shown in FIG. 8, the control section 26 determines the short-term allowable power level Ps and the long-term allowable power level Pl, which correspond to the battery temperature T, by means of taking the battery temperature T as a parameter.

Thus, when a plurality of allowable power levels P are present, the control section 26 may change the upper-limit value Na and the amount of downward revision, which are conditions for correction of the allowable power level P, according to each of the allowable power levels P. In this case, the greater the value of the allowable power level P, the greater the amount of charge/discharge of the secondary battery 30. Therefore, the greater the value of the allowable power value P, the greater a burden imposed on the secondary battery 30. A period over which the allowable power level P can be retained is short. For this reason, desirably, the greater the value of the allowable power level P, the lower value to which the upper-limit value Na is reduced. Thus, as a result of the upper-limit value Na being made lower as the value of the allowable power level P is greater, the count of the counter N reaches the upper-limit value Na at an appropriate timing before the secondary battery 30 becomes excessively discharged or charged even when the period over which power can be retained is short, and hence the control section 26 can appropriately subject the allowable power level P to downward revision. The value of the counter N can also be preliminarily determined from a result of a test according to the degradation of the battery.

For instance, when determining the short-period allowable power level Ps, and the long-term allowable power level Pl that is lower than the short-term allowable power level Ps, the control section 26 subjects the short-term allowable power level Ps to downward revision according to a flowchart shown in, e.g., FIG. 6. More specifically, when the count of the counter N has reached Na (e.g., Na=10), the control section 26 corrects the short-term allowable power level Ps to a lower long-term allowable power level Pl.

The long-term allowable power level Pl is subjected to downward revision according to a flowchart shown in, e.g., FIG. 7. More specifically, when the count of the counter N reaches Nb3 (e.g., Nb3=20), the control section 26 subjects the long-term allowable power level Pl to downward revision to one-half thereof. When the count of the counter N reaches Nb2 (e.g., Nb2=40), the long-term allowable power level Pl is downwardly revised to zero. When the count of the counter N reaches Nb1 (e.g., Nb1=60), the control section 26 issues a cutoff request to the vehicle ECU 10, thereby cutting transmission of power between the secondary battery 30 and the inverter 50.

As mentioned above, so long as the count of the counter N, which serves as a condition for downward revision, and the amount of downward revision are preliminarily determined from the value of the allowable power level P and the retention period, the respective allowable power levels P can be appropriately revised downwardly even when the control section 26 determines a plurality of allowable power levels P from the battery temperature T.

In the first modification of the embodiment, the control section 26 determines whether to perform downward revision by use of the actual loading power Pr determined through integration of the battery voltage V and the charge/discharge current I of the entire battery modules constituting the secondary battery 30. However, the control section 26 may also divide the groups of battery modules constituting the secondary battery 30 on a predetermined per-block basis; calculate an actual loading power level Prn for each block; and determine whether to effect downward revision by use of the actual loading power level Prn of each block.

In this case, the control section 26 sequentially calculates a differential power level $\Delta Pn$ between the actual loading power level Prn for each block and the allowable power level Pn for each block; determines whether or not the thus-calculated differential power level $\Delta Pn$ is greater than a predetermined threshold value $\alpha n$; and increments the count of the counter N when the differential power level $\Delta Pn$ is equal to or lower than the threshold value $\alpha n$. When the count has reached the upper-limit value, the control section 26 downwardly revises each of the allowable power levels Pn by the amount of downward revision corresponding to the count. Further, the control section 26 summates the downwardly-revised allowable power levels Pn of the respective blocks, thereby determining the allowable power level P of the entire secondary battery 30.

Figure 9:
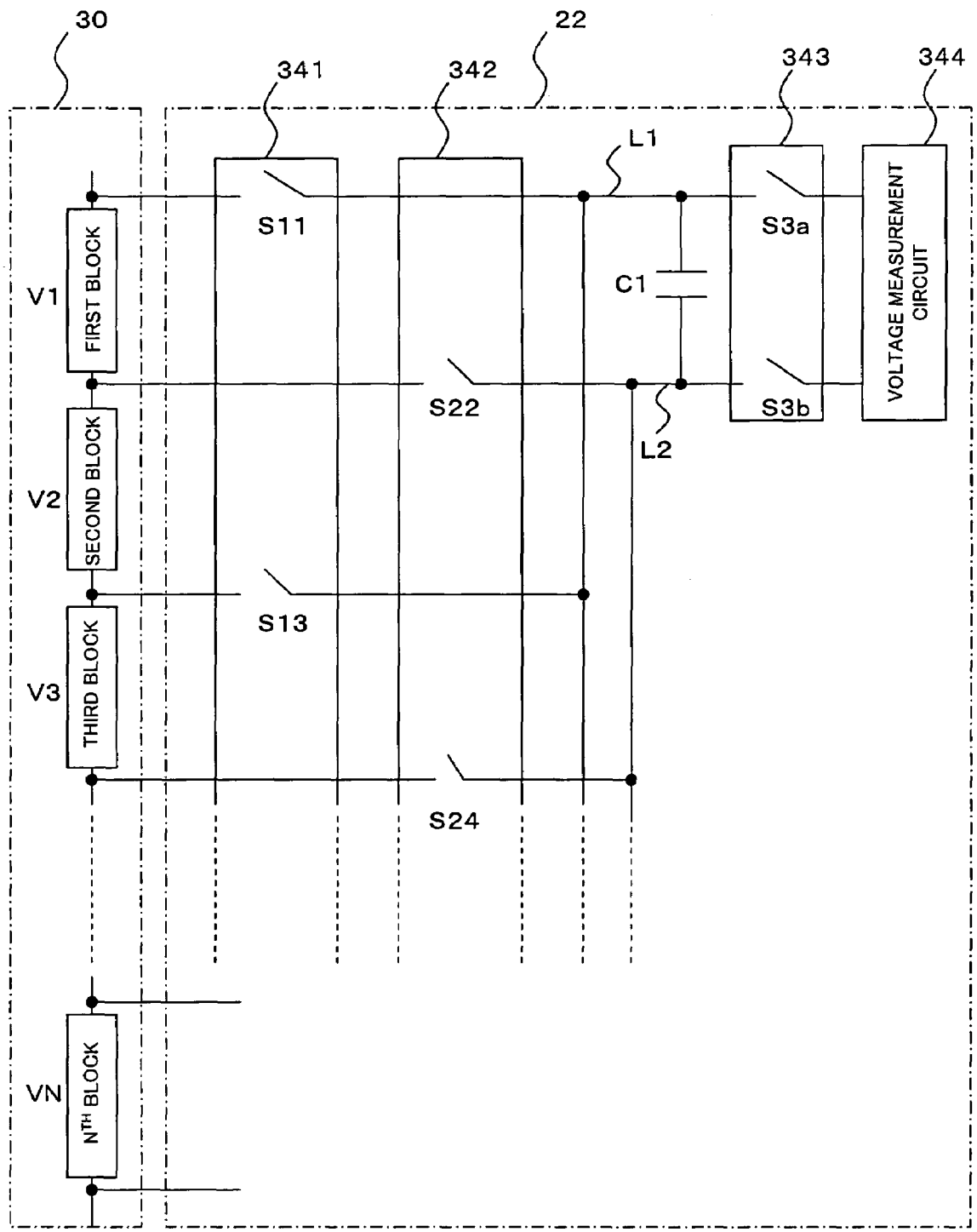
FIG. 9 is a view showing a circuit configuration of a voltage measurement apparatus capable of determining an actual loading power level Prn on a per-block basis.

As mentioned above, when the actual loading power level Prn is determined for each block, the essential requirement is that the voltage measurement section 22 provided in the battery ECU 20 should be formed from a circuit such as that shown in FIG. 9. In FIG. 9, the voltage measurement section 22 is made up of a first switching circuit 341, a second switching circuit 342, a third switching circuit 343, a flying capacitor circuit formed from a capacitor C1, and a voltage measurement circuit 344. In FIG. 9, the voltage measurement device 34 divides the groups of battery modules constituting the secondary battery 30 into N blocks, and measures a battery voltage Vn for each block.

First, in order to measure the battery voltage V1 of the first block, the voltage measurement section 22 activates a switching element S11 of the first switching circuit 341 and a switching element S22 of the second switching circuit 342. Thereby, one end of the first block is connected to one end of the capacitor C1 by way of the activated switching element S11 and a first potential detection line L1, and the other end of the first block is connected to the other end of the capacitor C1 via the activated switching element S22 and a second potential detection line L2. Thus, the battery voltage V1 of the first block becomes equal to an electric potential appearing across the capacitor C1.

Next, the voltage measurement section 22 deactivates the switching elements S11 and S22, and activates switching elements S3$a$ and S3$b$ of the third switching circuit 343.

Thereby, the electric potential appearing across the capacitor C1; that is, a battery voltage V1 of the selected first block, is input to and measured by the voltage measurement circuit 344.

In order to measure the battery voltage V2 of a second block, the voltage measurement section 22 activates a switching element S13 of the first switching circuit 341 and the switching element S22 of the second switching circuit 342. Thereby, one end (the other end of the first block) of the second block is connected to the other end of the capacitor C1 by way of the activated switching element S22 and the second potential detection line L2. The other end of the second block is connected to one end of the capacitor C1 by way of the activated switching element S13 and the first potential detection line L1. An electric potential V2 of the second block is of opposite polarity and becomes equal to an electric potential appearing across the capacitor C1.

The voltage measurement section 22 deactivates the switches S13 and S22, and the activates switching elements S3$a$ and S3$b$ of the third switching circuit 343. As a result, an electric potential appearing across the capacitor C1; namely, the battery voltage V2 of the selected second block, is input to the voltage measurement circuit 344 as an inverted signal −V2 and measured as V2.

As mentioned above, the battery voltage Vn can be measured on a per-block basis according to the flying capacitor method. The essential requirement is that the capacitor C1 be capacitive means which accumulates a battery voltage.

When the actual load power Prn is determined on a per-block basis, the current measurement section 23 measures, as In (n=1 to N), the charge/discharge current I measured by the voltage measurement section 22 at a timing at which the voltage Vn is measured on a per-block basis.

Thus, the control section 26 sequentially integrates the battery voltage Vn of each block output from the voltage measurement section 22 and the charge/discharge current In output from the current measurement section 23, thereby determining an actual loading power level Prn for each block. The control section 26 sequentially calculates the differential power level ΔPn between the actual load power Prn of each block and the allowable power level Pn of each block, and determines whether or not each of the thus-calculated differential power levels ΔPn is greater than the predetermined threshold value α$n$. When a result of determination shows that the differential power level ΔPn is equal to or less than the threshold value α$n$, the count of the counter N is incremented. When the count has reached the upper-limit value, each of the allowable power levels Pn is downwardly revised by the amount of downward revision corresponding to the count.

The above descriptions have mentioned that, when the differential power level ΔP continually becomes equal to or less than the threshold value α, the control section 26 increments the count of the counter N. However, the battery voltage and the charge/discharge current of the secondary battery 30 mounted as a power source of a drive source of a hybrid vehicle, or the like, change in the form of a pulse. Therefore, there is a case where the differential power level ΔP is temporarily greater than the threshold value α, depending on a timing at which measurement is to be performed. In this case, regardless of the secondary battery 30 remaining excessively charged or discharged, the differential power level ΔP is not continually equal to or less than the threshold value α. Hence, there is a chance of the count of the counter N not being incremented and failing to reach the upper-limit value. In this case, there is a risk of the allowable power level Pn failing to be downwardly revised appropriately.

Accordingly, the control section 26 defines a predetermined count period and measures the number of times the differential power level ΔP has become equal to or lower than the threshold value α during the count period. So long as the count has reached the upper-limit value, the allowable power level Pn may be downwardly revised according to the count.

Figure 10:
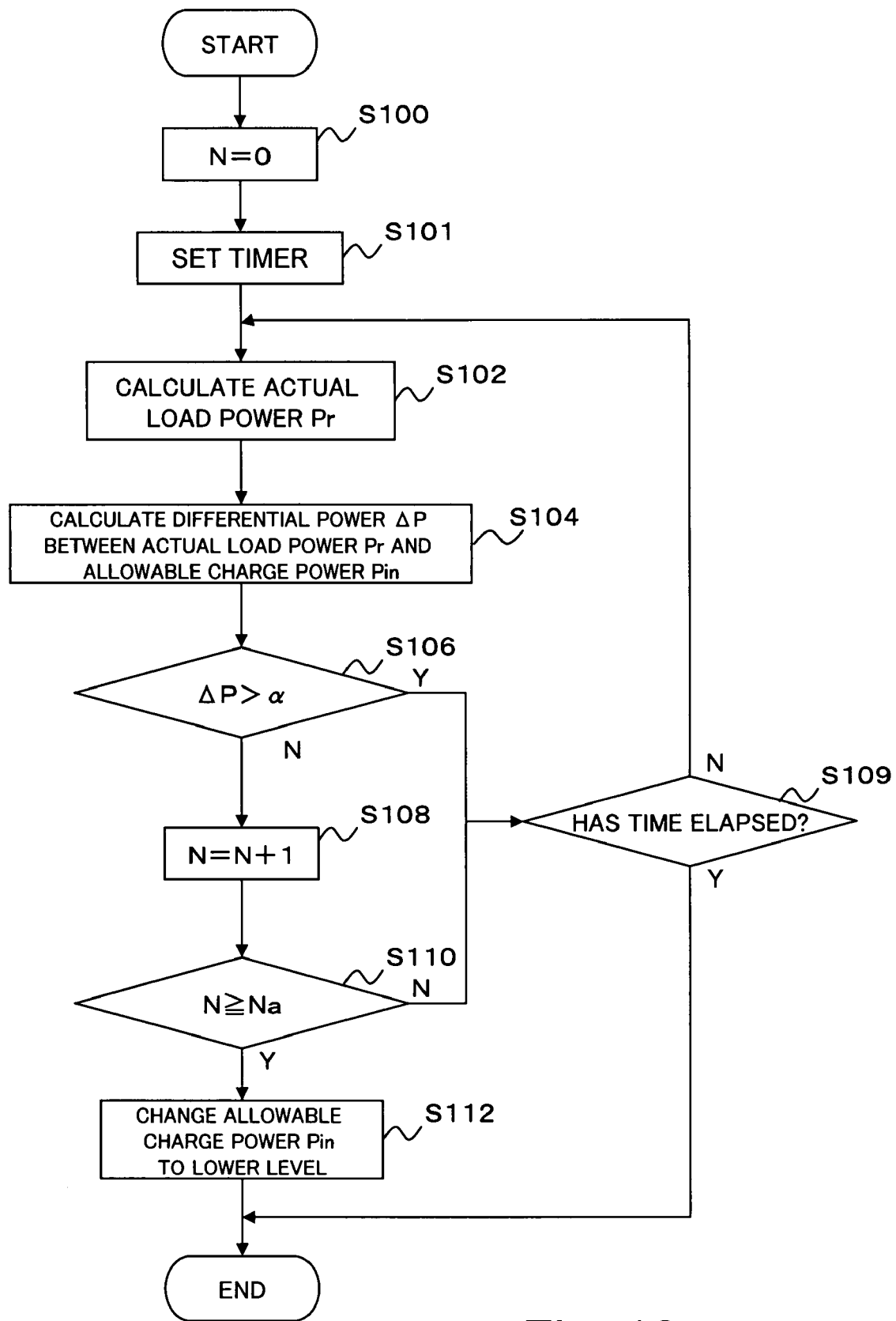
FIG. 10 is a flowchart showing processing procedures employed when the battery ECU measures the number of times a differential power level ΔP has assumed a threshold value α or less during a predetermined count period of time and makes a downward revision.
Figure 11:
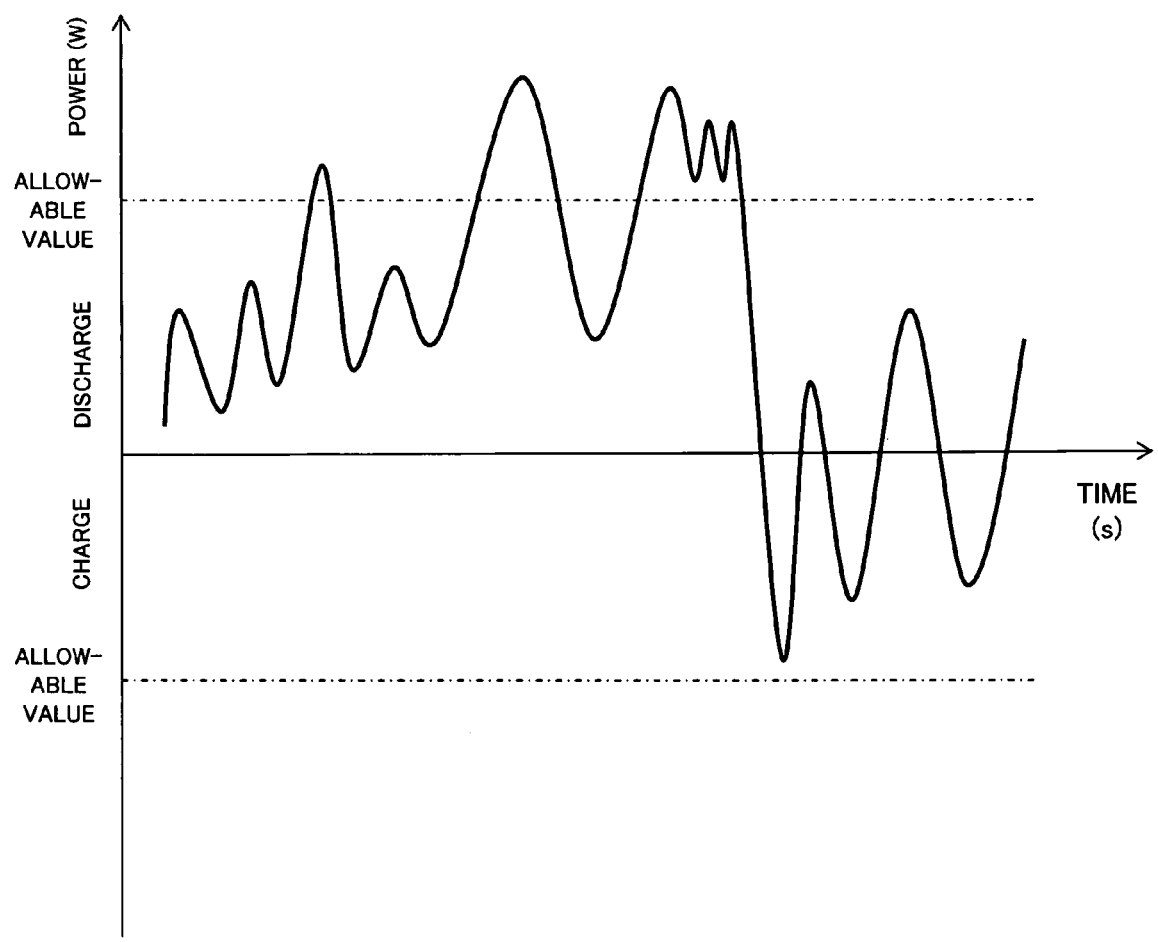
FIG. 11 is a view for describing temporal variations in charging/discharging power of the secondary battery that is mounted in an electric vehicle, a hybrid vehicle, or the like, and iterates charging/discharging operation within a short period of time.

In this case, for example, the control section 26 downwardly revises the allowable power level P according to the flowchart shown in FIG. 10.

In FIG. 10, the control section 26 sets a timer in step S101. Subsequently, when the differential power level ΔP is greater than the threshold value α (the result of determination rendered in step S106 is affirmative "Y") and when the count of the counter N has not reached the upper-limit value Na (the result of determination rendered in step S110 is negative "N"), the control section 26 determines whether or not the timer set in step S101 has reached the predetermined count period (S109). When the count period has not yet been reached, the control section 26 further continues processing subsequent to step S102.

As a result, even when the differential power level ΔP has become temporarily equal to or lower than the threshold value α, the upper-limit value is reached when the count made by the counter N during the predetermined period is large, and hence the control section 26 can downwardly revise the allowable power level P. Consequently, there can be avoided a situation where the allowable power level P fails to be downwardly revised because the differential power level ΔP has not continually become equal to or lower than the threshold value α regardless of the secondary battery 30 remaining excessively charged or discharged.

The above descriptions have mentioned an example where the control section 26 changes the amount of downward revision of the allowable power level P according to the number of times the differential power level ΔP has become equal to or lower than the threshold value α. For instance, as another example, the control section 26 may extract an actual loading power level Pr having surpassed the allowable power level P until the count of the counter N reaches the upper-limit value; determine a mean difference between an each extracted actual loading power level Pr and the allowable power level P; and increase the amount of downward revision as the mean value becomes greater. Moreover, the control section 26 may also select the actual loading power level Pr that differs most from the allowable power level P among the actual loading power levels Pr having surpassed the allowable power level P until the count of the counter N reaches the upper-limit value, and determine the amount of downward revision according to the difference between the selected actual loading power level Pr and the allowable power level P.

Moreover, the above descriptions have mentioned an example, when the count of the counter N has reached the upper-limit value, the allowable power level P is downwardly revised. As another example, even when the differential power level ΔP becomes equal to or lower than the threshold value α, the control section 26 may determine the amount of downward revision so as to become greater with an increase in difference every time actual loading power level Pr surpasses the allowable power level P; and downwardly revise the allowable power level P. In addition, a cycle at which the control section 26 calculates the differential power level ΔP may be made shorter with an increase in the load of the secondary battery 30 (the amount of discharged power or the amount of recharging power).

The control section 26 can be embodied by means of installing in a microcomputer a program which implements various processing operations shown in FIGS. 6, 7, and 10, and causing the program to run. In this case, a central processing unit (CPU) of the microcomputer functions as the control section 26.

The above descriptions have mentioned the configuration wherein the battery ECU 20 has the control section 26. However, another ECU, such as the vehicle ECU 10, may have the control section 26, or an ECU dedicated to the control section 26 may also be provided separately.

What is claimed is:

1. A system for controlling charging/discharging of a secondary battery comprising:
   a power level calculating section for calculating an actual loading power level of a secondary battery;
   a differential calculating section for calculating a differential power level between the calculated actual loading power level and an allowable power level achieved during charging/discharging of the secondary battery; and
   an allowable power level control section for measuring a number of times the calculated differential power level has become equal to or lower than a predetermined threshold value and downwardly revising the allowable power level when a count has become equal to or greater than a predetermined upper-limit value.

2. The system for controlling charging/discharging of a secondary battery according to claim 1, wherein the allowable power level control section measures a number of times the calculated differential power level has continually become equal to or lower than the predetermined threshold value.

3. The system for controlling charging/discharging of a secondary battery according to claim 1, wherein the allowable power level control section measures the number of times the calculated differential power level has become equal to or lower than the predetermined threshold value within a predetermined period.

4. The system for controlling charging/discharging of a secondary battery according to claim 1, wherein the allowable power level control section increases an amount of downward revision to the allowable power level as the count is greater.

5. The system for controlling charging/discharging of a secondary battery according to claim 1, wherein the allowable power level control section increases an amount of downward revision to the allowable power level as the differential power level is greater when the actual loading power level surpasses the allowable power level.

6. The system for controlling charging/discharging of a secondary battery according to claim 1, further comprising:
   cutoff means for cutting off charging/discharging of the secondary battery, wherein
   the allowable power level control section downwardly revises the allowable power level to zero and requests the cutoff means to cut charging/discharging of the secondary battery when the count has reached a predetermined highest-limit value.

7. The system for controlling charging/discharging of a secondary battery according to claim 1, wherein the allowable power control section downwardly revises the allowable power level having reached the upper-limit value by an amount of downward revision determined for each allowable power level each time the count reaches the upper-limit value determined for each allowable power level when there are a plurality of allowable power levels whose power levels differ from each other.

8. The system for controlling charging/discharging of a secondary battery according to claim 1, wherein the secondary battery is formed by combination of a plurality of battery modules;
   the allowable power level is determined for each of blocks into which battery modules constituting the secondary battery are divided on a predetermined unit;
   the power level calculating section calculates an actual loading power level of the secondary battery on a per-block basis; and
   the allowable power level control section measures the number of times a differential power level calculated on a per-block basis has become equal to or lower than a predetermined threshold value and downwardly revises each of the allowable power levels determined for each block when the count has become equal to or greater than a predetermined upper-limit value.

9. The system for controlling charging/discharging of a secondary battery according to claim 1, wherein the power level calculating section calculates the actual loading power level at a shorter interval as a load on the secondary battery is greater.

10. A battery controller for adaptively setting an allowable power level of a secondary battery subjected to charging/discharging control within a range of charging/discharging capability in accordance with the allowable power level set according to at least a temperature, the controller comprising:
    a power level calculating section for calculating an actual loading power level of the secondary battery;
    a differential calculating section for calculating a differential power level between a calculated actual loading power level and the allowable power level; and
    an allowable power level control section for measuring the number of times the calculated differential power level has become equal to or lower than a predetermined threshold level and downwardly revising the allowable power level when a count has become equal to or greater than a predetermined upper-limit level.

11. A system for controlling charging/discharging of a secondary battery comprising:
    a power level calculating section for calculating an actual loading power level of a secondary battery;
    a differential calculating section for calculating a differential power level between the calculated actual loading power level and an allowable power level achieved during charging/discharging of the secondary battery; and
    an allowable power level control section for, when the calculated differential power level has become equal to or lower than a predetermined threshold level and also the actual loading power level surpasses the allowable power level, downwardly revising the allowable power level by a greater amount of downward revision as the differential power level is greater.

12. A battery controller for adaptively setting an allowable power level of a secondary battery subjected to charging/discharging control within a range of charging/discharging capability in accordance with the allowable power level set according to at least a temperature, the controller comprising:
    a power level calculating section for calculating an actual loading power level of the secondary battery;
    a differential calculating section for calculating a differential power level between a calculated actual loading power level and the allowable power level; and,
    an allowable power level control section for, when the calculated differential power level has become equal to or lower than a predetermined threshold value level and also the actual loading power level surpasses the allowable power level, downwardly revising the allowable power level by a greater amount of downward revision as the differential power level is greater.

13. A system for controlling charging/discharging of a secondary battery comprising:

an allowable level setting section for setting an allowable power level of the secondary battery according to at least one of a battery temperature, a state of charge, and a battery voltage of the secondary battery; and a charging/discharging control section for controlling charging/discharging of the secondary battery according to the allowable power level, the section allowing charging/discharging operations exceeding the allowable power level before the number of times an actual loading power level of the secondary battery has exceeded the allowable power level reaches a predetermined number of times, and controlling charging/discharging of the secondary battery in accordance with a second allowable power level which is lower than the allowable power level when the number of times has reached the predetermined number of times.

14. The charging/discharging control system according to claim 13, wherein the secondary allowable power level becomes lower as the number of times becomes greater within a predetermined period.

15. The charging/discharging control system according to claim 14, wherein the secondary allowable power level becomes essentially zero when the number of times has reached an upper-limit number of times greater than the predetermined number of times within a predetermined period of time, and the control section stops charging/discharging of the secondary battery.

* * * * *